Dec. 11, 1951
W. FEW
2,578,235
PHASE SHIFTING SYSTEM
Filed Dec. 26, 1946
2 SHEETS—SHEET 1
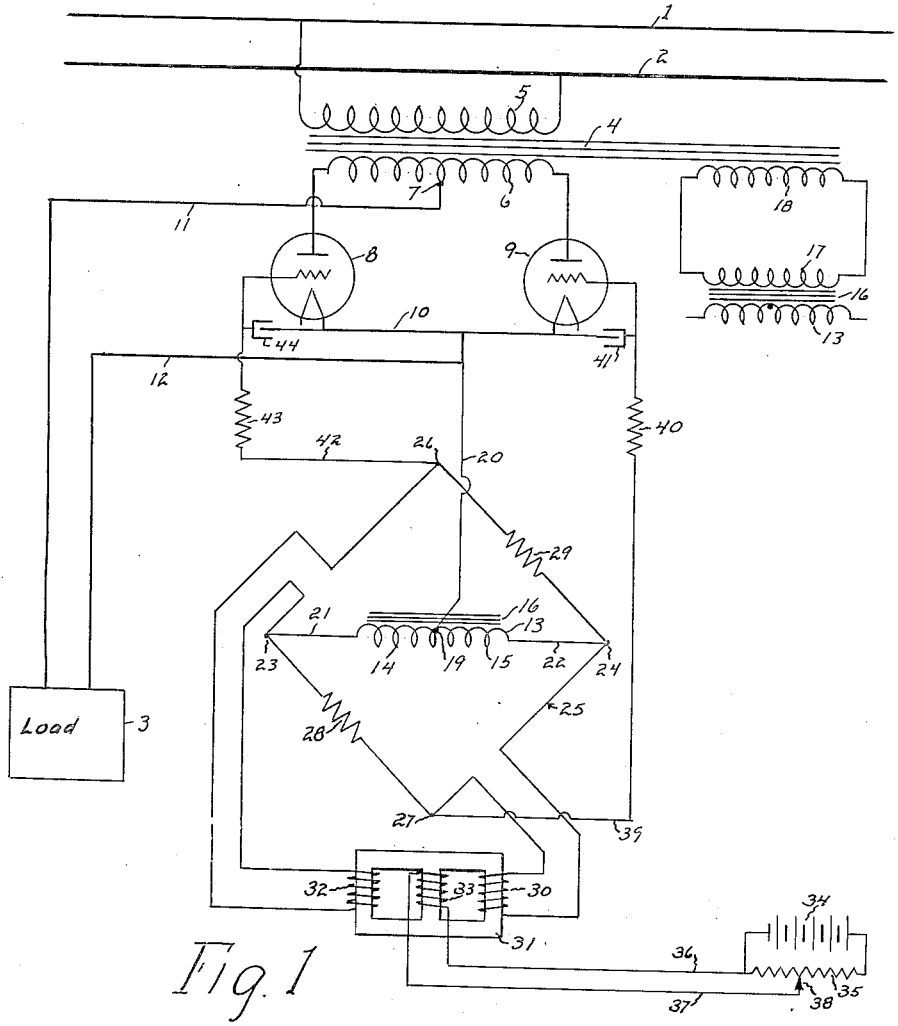
Fig. 1
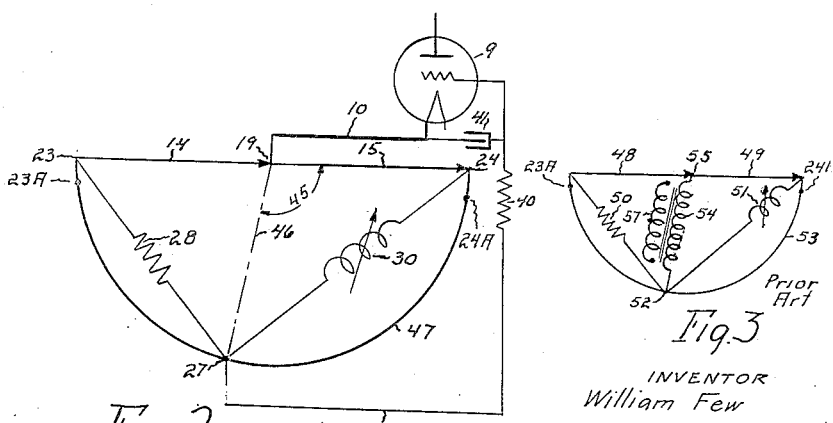
Fig. 2
Fig. 3
Prior Art
INVENTOR
William Few
By Harry R. Canfield
ATTORNEY Dec. 11, 1951

W. FEW 2,578,235

PHASE SHIFTING SYSTEM

Filed Dec. 26, 1946

INVENTOR
William Few
By Harry R. Canfield
ATTORNEY

Patented Dec. 11, 1951

2,578,235

UNITED STATES PATENT OFFICE 2,578,235

PHASE SHIFTING SYSTEM

William Few, Cleveland Heights, Ohio, assignor to The Clark Controller Company, Cleveland, Ohio, a corporation of Ohio Application December 26, 1946, Serial No. 718,425

7 Claims. (Cl. 323—37)

This invention relates to phase shifting systems for shifting the phase of the grid energization of a triode rectifier tube to control the output of the tube.

In well known systems of phase shifting, the tube grid is energized by alternating potential of the same frequency as that of the potential impressed on the main electrodes of the tube, and the grid wave is in general of opposite polarity to that of the tube-impressed wave, during the conducting half wave of the tube-impressed potential, and the phase of the grid wave is shifted in one direction to substantially "span," so to speak, the base of the tube-impressed wave and prevent the tube from passing current, or more than small current, and is shifted in the other direction to span less of the base of the tube-impressed wave to cause the tube to pass more current. In such systems a high impedance transformer primary is generally provided, the potential across which is variably shifted in phase by a circuit comprising resistance and variable inductance, and a secondary of the transformer, whose output potential is accordingly shifted in phase, supplies the shifted grid potential; and the variable inductance is varied by means of a saturable reactor having a variably energizable unidirectional winding.

Such systems have the defect, that the total possible range or angle of shifting is curtailed by the fact that a considerable current flows in the transformer primary.

It is one of the objects of the present invention to provide a grid phase shifting system of this general class in which the said transformer is eliminated from the system, whereby not only is the cost of the high impedance transformer saved, but a greater angle of shifting and therefore more complete control of the tube is made possible.

Another object is to provide, in a phase shifting system of this class, connections incorporating an inductance varying saturable reactor into the system in an improved manner, resulting in improvements in its mode of operation.

In some tube rectifying systems the load, energized from alternating supply mains by the rectified current, at times, either because of inherent properties of the load or by intention and control, supplies unidirectional potential and current back through the rectifying tubes by inversion and delivers it as alternating current to the alternating supply mains.

This unidirectional potential is superimposed upon the rectifier tube-impressed potential and has the effect of making the conducting half wave of the tube-impressed potential broader at its base, so that the grid wave cannot span it and fully control the tube, as aforesaid; and if the grid wave is shifted in the direction to span more of it in the attempt to control the tube output, it will uncover the tube impressed wave base at its early firing portion and lose control of it and cause the tube to rectify instead of to invert, and to pass an excessive and destructive or damaging amount of current.

In the present system this is prevented. The grid wave itself has a unidirectional component of potential superimposed upon it which has the effect of making it also broader at its base, so that it can be shifted to span the base-broadened tube-impressed wave and control its output; and as an additional and safety precaution, the grid wave is given a permanent displacement toward the early firing portion of the tube-impressed wave so that it can always without fail be shifted to delay firing of the tube to fully control it.

It is therefore another object of the present invention to provide in a phase shifting system of this class, means for superimposing on the grid wave the aforesaid unidirectional potential, and means for giving to the grid wave the aforesaid permanent phase displacement, for the purposes referred to.

Other objects will be apparent to those skilled in the art to which the invention appertains.

The invention is fully disclosed in the following description taken in connection with the accompanying drawing, in which:

Fig. 1 is a diagrammatic view of a triode rectifier system comprising a phase shift system embodying the invention in one form;

Fig. 2 is a vector diagram indicating the functions of certain features of the phase shifting system of Fig. 1;

Fig. 3 is a vector diagram of prior art for comparison with Fig. 2;

Figure 4:
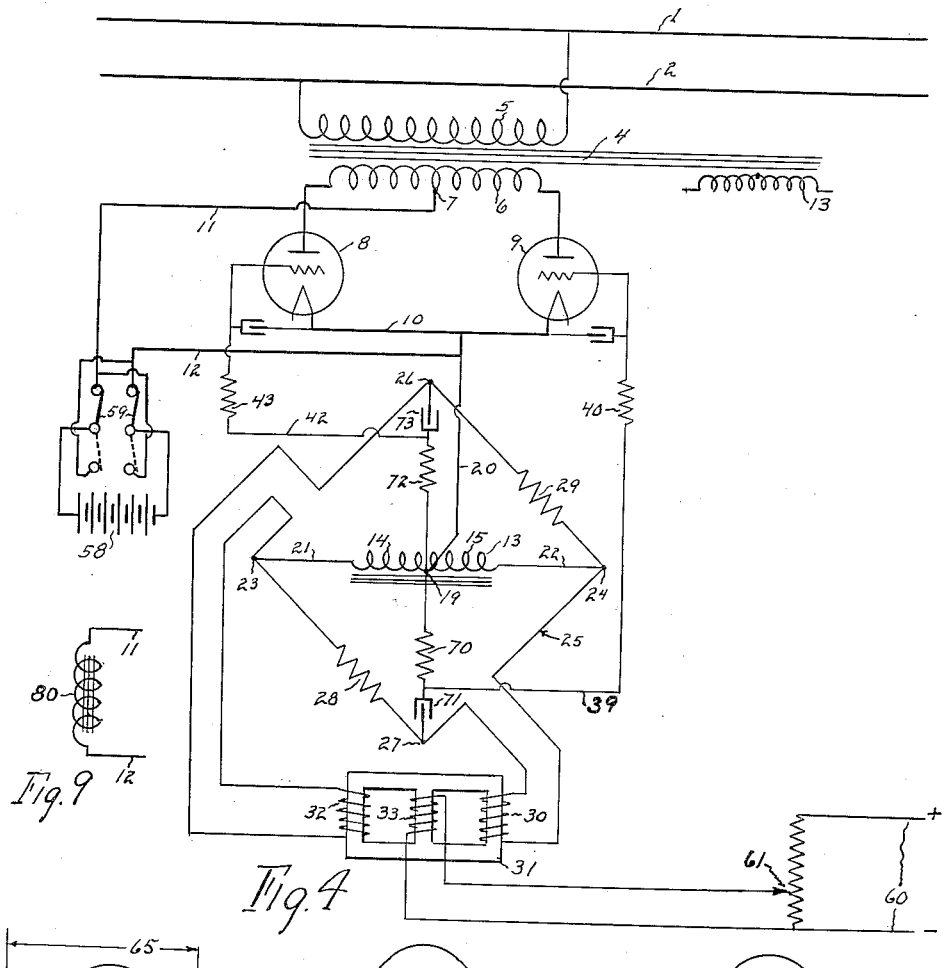
Fig. 4 is a view similar to Fig. 1 illustrating another embodiment.
Figure 6:
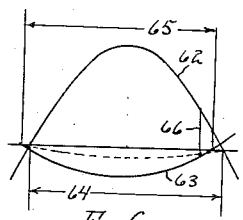
Figure 7:
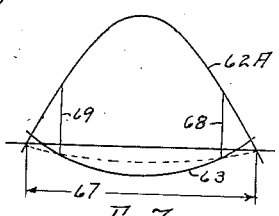
Figure 8:
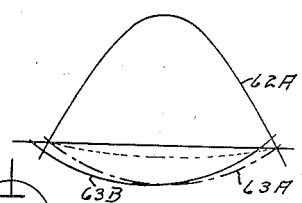

Figs. 6, 7, and 8 are diagrammatic views of the conducting half wave impressed on a rectifier tube and the energizing wave of potential on the grid thereof, illustrating a part of the operation of the embodiment of Fig. 4;

Fig. 9 is a fragmentary view of a modification of a part of Fig. 4.

Referring to Figs. 1 and 2 of the drawing, a two-triode rectifying system is shown by which rectified current is supplied from alternating current mains 1 and 2, to a load 3, the rectifying system comprising a transformer 4 having a primary 5 connected to the mains 1 and 2, a bi-phase secondary 6 having a mid-point 7 and connected at its ends to the anodes of rectifier tubes 8 and 9, the tubes having a common cathode main 10, and mains 11 and 12 connecting the load 3 to the mid-point 7 of the bi-phase secondary 6 and to the cathode main 10. The circuits for heating the tube cathode have, conventionally, been omitted.

The system for energizing the grids of the tubes 8 and 9 for shifting the phase of the grid energization is as follows.

A bi-phase transformer secondary 13 comprising parts 14—15 is provided, and in the embodiment of the invention of Fig. 1 may be the secondary of a transformer 16 having a primary 17 and the latter energized by a secondary 18 of the transformer 4 (but as shown in the form of Fig. 3, to be described, the secondary 13 may be a secondary of the transformer 4).

The secondary 13 is shown without connections thereto in the upper right hand part of the diagram Fig. 1 and associated with its energizing primary 17 and is reproduced in the phase shifting system of which it is a part, directly under the tubes 8 and 9 but without its primary to avoid complications in the representation of the circuits.

The mid-point 19 of the bi-phase secondary 13 is connected by a wire 20 to the common cathode main 10; and its ends are connected by wires 21 and 22 to the opposite diagonal corners 23 and 24 of a rectangular loop indicated generally at 25, and the other diagonal corners of the rectangular loop being identified at 26 and 27. Between the points 23 and 27 is a resistor 28, and between the points 24 and 26 is a resistor 29.

Between the points 24 and 27 is an inductor in the form of a winding 30 on one leg of a three leg saturable reactor core 31; between the points 23 and 26 is connected a similar reactor winding 32. On the middle leg of the saturable reactor is a unidirectional winding 33 which may be energized from any suitable source of variable unidirectional potential, that shown as an illustrative example comprising a battery 34, a potentiometer resistance 35 across its terminals, and wires 36 and 37 from the winding 33 to one end of the resistor 35 and to an adjustable point 38 on the resistor respectively.

The point 27 is connected by a wire 39 to the grid of the tube 9 through the conventional current limiting resistor 40 and with the conventional capacitor 41; and the point 26 is connected by a wire 42 to the grid of the tube 8 through the conventional resistor 43 and with the conventional capacitor 44.

In explanation of the operation of the grid energization and phase shifting, reference may be had to the vector diagram, Fig. 2, in which points and elements are given the same reference characters as in Fig. 1 for the tube 9.

The vectors 14 and 15 represent the potentials of the two parts 14 and 15 of the bi-phase secondary 13. Alternating potential develops across the points 19 and 27, and generally opposite in polarity to the conducting half wave of potential impressed on the tube 9, and energizes the grid of the tube 9, and the phase relation or angular displacement of the grid energization with respect to the conducting half wave of tube-impressed potential, will be the phase angle 45 between the vector 15 and an imaginary line 46, and the angle will change as the point 27 swings around the circular arc 47, effected by a change of inductance of the saturable reactor winding 30, caused by different degrees of energization of the unidirectional winding 33 of the saturable reactor.

By increasing the energization of the winding 33 by moving the point 38, on the potentiometer resistor 35, the effective inductance of the winding 30 will be decreased and the grid phase angle 45 decreased, and the tube 9 will fire earlier in its conducting half wave; and decreasing the energization of the winding 33 will cause the grid wave to be shifted to cause the tube 9 to fire later in its wave.

The vector diagram of Fig. 2 may be said to apply to the lower half of the loop 25 of Fig. 1 and a similar vector diagram and similar description will apply to energizing the grid of the tube 8 utilizing the upper half of the loop 25 as will be understood.

It will be noted that the alternating windings 32 and 30 on the saturable reactor core 31 while indicated as wound oppositely, tend to generate alternating fluxes in series with each other, and that the alternating flux does not pass through the winding 33 and generate an alternating component of potential therein to interfere with its operation, this resulting from the fact that the two windings 32 and 30 are not in series with each other nor connected in parallel relation with each other as in prior phase shift systems utilizing saturable reactors. These windings 32 and 33 while being associated together magnetically on the saturable reactor core 31 are isolated from each other electrically in the bridge loop 25.

With the phase shift system here described, the inductance 30 can be increased to a high value and decreased to a low value so that the total swing of the point 27 approaches 180 degrees, approaching closely the points 23—24, for example to the points 23A and 24A with a corresponding great total angle of adjustment for the grid wave.

The action of the prior phase shifting system of this general class referred to hereinbefore, is illustrated in Fig. 3, as compared with Fig. 2.

Bi-phase secondary potentials 48—49 are derived from the mains 1—2 and a resistor 50 and an inductor of variable inductance 51, is connected across them, so that variation of the inductance 51 causes point 52 to swing around the arc 53; but a transformer primary 54 is connected across the points 55—52, and energizes a bi-phase secondary 57 and the grids are energized by the bi-phase secondary. The presence of the primary 54 curtails at both ends the total swing of the point 52 so that the total range of phase angle shift is less than that above described for the present invention. This may be explained as follows.

Let it first be assumed for comparison purposes that in Fig. 2, the point 27 can be swung to the range 23A—24A by increasing and decreasing the inductance 30.

In Fig. 3, the potential across the points 55—52 causes a considerable transformer primary current to flow therebetween and this current flows through the resistance 50 and inductance 51. There is also a flow of current through the resistor 50 and the inductance 51 in series.

Assume now that the inductance 51 be increased to a high value causing the point 52 to approach the point 23A (corresponding to Fig. 2). The current in the transformer primary 54 will now flow almost entirely through the resistor 50. There is a potential drop in the resistance 50 due to the said series current. But the potential drop of the primary current in the resistor 50 is added to this drop and the result is that the resistance 50 is thereby made more effective, and the point 52 will not attain the position 23A, but fall short of it.

Again, assume that the inductance 51 is decreased to a very small value causing the point 52 to approach the point 24A (corresponding to Fig. 2).

The current in the transformer primary now flows almost entirely through the inductance 51; but the potential drop of the primary current in the inductance 51 is added to the drop in the inductance 51 due to the said series current, and the result is that the inductance 51 is made more effective and the point 52 will not attain the position 24A but fall short of it.

True, the primary current in the first instance is not exactly in phase with the series current in the resistor 50, and in the second instance is not in exact phase with the series current in the inductance 51; but neither is it in either instance 180 degrees out of phase therewith; so that in both instances there is an overlapping of the two currents, and the drop due to the series current is increased as stated by the drop due to the primary current.

In Fig. 1, the load 3 may be any kind of a load and will be energized with more or less current as the potentiometer point 38 is adjusted to cause the tubes 8—9 to fire earlier or later as will be understood.

In the form of the invention of Fig. 4, a rectifying circuit is provided similar to that of Fig. 1 as indicated by the same reference characters on many of the parts; but the mains 11—12 supply current to a load which in controlling the operation of the system develops a unidirectional potential of its own, the load chosen as illustrative being a battery 58 to be charged by the rectified current. A throw-over or reversing switch 59 is provided operable from the solid line position for charging the battery, to the dotted line position in which the battery may be used to discharge current back through the rectifying system, and by the principle of inversion, supply it to the mains 1—2 as alternating current to boost the potential thereof for well known purposes.

The grid energization for the tubes 8—9 is supplied by a phase shifting system similar to that of Fig. 1 (with additional features to be described) and the grid phase angle is changed by the saturable reactor 31, the unidirectional winding of which is (in this case) energized from any suitable source 60 of direct or unidirectional current through an adjustable potentiometer having a movable point 61.

When the battery 58 is being charged it may become desirable to change the charging current and to this end the phase system would be adjusted by the point 61 to cause the tubes 8—9 to fire earlier or later in the tube-impressed wave. If the charging current is reduced to a small value, the conditions will be those of Fig. 6 where the tube impressed wave is shown at 62 and the grid wave at 63; the wave 62 having a base width 64 and the grid wave having a base width 65 and the tube firing at 66, as will be understood.

When the switch 59 is thrown to discharge the battery 58 by inversion for boosting as referred to, the unidirectional potential of the battery will be superimposed upon the tube impressed wave, and in the absence of other provisions the condition will be that of Fig. 7, wherein as shown the base 67 of the tube-impressed wave now 62A has increased, and the grid wave 63 is no longer able to span it; and if the point 61 were adjusted to control the rate of discharge, by shifting the grid wave toward a later firing point in the tube-impressed wave, for example, to causing firing at the point 68, the tube would fire at the point 69 at an early point in the wave 62A.

As is well known, for inversion to occur in a rectifying tube system, the tube grid must be energized for firing of the tube later than the 90 degrees point of the tube impressed wave; so that under the conditions of Fig. 7, inversion would not occur, the tubes would fire early, and rectify, and the switch 59 being set in the dotted line position, high value rectified current would flow through the battery in the discharging direction and destroy it.

To correct for this, the phase shifting system is modified to cause the grid wave itself to be broader at its base; for example as shown in Fig. 8 at 63A, so that at all phase angle adjustments it can always span the base of the wave 62A to prevent firing in the early part thereof; and as a further and safety precaution and without further complication, is given a permanent displacement toward the early part of the wave 62A; and the grid wave thus modified is shown, as an illustrative example at 63B, Fig. 8.

This modified grid wave is produced in the grid phase system, as shown in Fig. 4 by means of a resistor 70 and a capacitor 71 for the tube 9, connected in series across the points 19 and 27; and a resistor 72 and capacitor 73 for the tube 8 connected across the points 19 and 26.

The action of these resistors and capacitors can best be explained by reference to Fig. 5, which as will be seen is like Fig. 2 except for the addition of the resistor 70 and capacitor 71 and the vectors associated therewith; and a briefer description than otherwise will suffice.

The capacitor 71 and resistor 70 being connected in series across the points 19 and 27, the alternating potential across these points will cause alternating current to flow therethrough and the drop of potential in the resistor and capacitor due to this current will be at right angles to each other and the vectors 74 and 75 illustrate this relation. This current is of very small value, corresponding to the grid circuit current. The grid wire 39 is connected to the right angle point 76.

An imaginary vector 77 indicates the phase angle 78 of the grid potential without the resistor 70 and capacitor 71, and the angular position of the vector 74, angle 79 indicates it with the capacitor and resistor and give the aforesaid permanent displacement of phase angle to the grid wave energized from the point 76, (the angle 79 being exaggerated for clearness in the drawing).

If it be assumed that the capacitor 71 is charged, then since the grid current in the wire 39 flows from the point 76 when the tube 9 has its firing half wave impressed upon it, the unidirectional potential of the capacitor 71 is impressed on the grid wave and broadens its base as described.

The charge on the capacitor 71 is provided for as follows: The current between the points 91—27 is alternating. Each time it flows from the point 27 toward the point 19, all of it flows through the capacitor 71 and charges it, (the current dividing at the point 76 and the part flowing to the wire 39, but this is at the half wave in which the tube 9 does not fire). Each time it flows from the point 19, toward the point 27, and to the wire 39 for energizing the grid to fire the tube, the capacitor gives up a part of its charge to the grid circuit as referred to. Thus the capacitor 71 is kept charged for the purposes described.

In operating the system of Fig. 4, with the battery 58 as referred to, to go from rectification to inversion, the switch 59 may be opened, cutting off rectification; the point 61 may then be operated to adjust the grid wave angle for inversion, and then the switch 59 thrown to the dotted line position; or the grid wave angle may be adjusted to a lower value of rectification suitable for inversion, and the switch 59 then thrown from solid line to dotted line position.

In some cases, the load may be a highly inductive load, connected to the mains 11—12 as indicated fragmentarily by Fig. 9, where 80 is the load. Illustrative of such loads are magnetic brakes and clutches as used on power driven machinery. It is difficult to quickly de-energize a highly inductive load by rupturing the current through it, because of the high unidirectional potential induced by the rapidly decaying magnetic field. Such a load however may be quickly de-energized by utilizing the principle of inversion when it is energized by a rectifying circuit.

In the practice of the present invention the load 80 across the mains 11—12 is energized by rectification. When the point 61 is operated to shift the grid wave angle to more than 90 degrees, inversion will be set up and the load will discharge back into the mains 1—2 as alternating current and be quickly de-energized. The discharging load superimposes a unidirectional component of potential on the rectifier system as described, but the invention prevents abnormal operation as described which otherwise might result upon shifting the grid wave phase for inversion.

Figure 5:
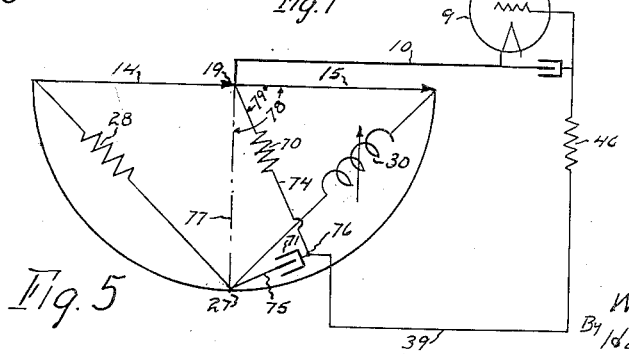
Fig. 5 is a vector diagram for the embodiment of Fig. 4.

I am aware that in Figs. 2 and 5, the actual arc on which the point 27 moves as the inductance 30 is varied is not a true circular arc concentric with the point 19 as illustrated; but that its actual shape is modified by utilization of a constant resistance 28, and by the current load between the points 19—27. But the principles and mode of operation of the invention as explained with the conventional circular arc are substantially the same as with a more accurately developed arc, and the conventional circular arc has therefore been used for simplification.

I claim:

1. In a phase shifting system, a transformer having a primary for energization from a source of alternating potential and a bi-phase secondary; a saturable reactor comprising a core and a unidirectional current winding and two alternating current inductor windings on the core; two resistors; one inductor winding and one resistor being connected in series across opposite points of the secondary and a first circuit whose phase is to be shifted connected to the mid-point of the secondary and to a point between the one inductor winding and the one resistor; the other inductor winding and the other resistor being connected in series across opposite points of the secondary, and a second circuit whose phase is to be shifted connected to the mid-point of the secondary and to a point between the said other inductor winding and the said other resistor; and means to variably energize the unidirectional winding with unidirectional current.

2. In a phase shifting system, a transformer having a primary for energization from a source of alternating potential and a bi-phase secondary; a saturable reactor comprising a three legged core and a unidirectional current winding on the middle leg and two alternating current inductor windings on the two outer legs respectively; two resistors; one inductor winding and one resistor being connected in series across opposite points of the secondary and a first circuit whose phase is to be shifted connected to the mid-point of the secondary and to a point between the one inductor winding and the one resistor; the other inductor winding and the other resistor being connected in series across opposite points of the secondary, and a second circuit whose phase is to be shifted connected to the mid-point of the secondary and to a point between the said other inductor winding and the said other resistor; and means to variably energize the unidirectional winding with unidirectional current.

3. In a phase shifting system, a transformer having a primary for energization from a source of alternating potential and a bi-phase secondary; a saturable reactor comprising a core and a unidirectional winding and an alternating current inductor winding on the core; two resistors and a capacitor; the inductor winding and one resistor being connected in series to opposite points of the secondary; the other resistor and the capacitor being connected in series between the mid-point of the secondary and a point between the said one resistor and the inductor winding; a circuit whose phase is to be shifted connected to the mid-point of the secondary and to a point between the capacitor and the said other resistor; and means to variably energize the unidirectional winding with unidirectional current.

4. In a phase shifting system, a transformer having a primary for energization from a source of alternating potential and a bi-phase secondary; a saturable reactor comprising a core and a unidirectional winding and two alternating current inductor windings on the core; four resistors and two capacitors; one inductor winding and a first resistor connected in series across opposite points of the secondary; a second resistor and one capacitor connected in series between the mid-point of the secondary and a point between the one inductor winding and the first resistor; the other inductor winding and a third resistor connected in series across opposite points of the secondary; and a fourth resistor and the other capacitor connected in series between the mid-point of the secondary and a point between the other inductor winding and the third resistor; a first circuit whose phase is to be shifted connected to the mid-point of the secondary and to a point between the second resistor and the one capacitor; a second circuit whose phase is to be shifted connected to the mid-point of the secondary and a point between the fourth resistor and the other capacitor; and means to variably energize the unidirectional winding with unidirectional current.

5. In a phase shifting system, a transformer having a primary for energization from a source of alternating potential and a bi-phase secondary; a saturable reactor comprising a three legged core and a unidirectional current winding on the middle leg and two alternating current inductor windings on the two outer legs respectively; four resistors and two capacitors; one inductor winding and a first resistor connected in series across opposite points of the secondary; a second resistor and one capacitor connected in series between the mid-point of the secondary and a point between the one inductor winding and the first resistor; the other inductor winding and a third resistor connected in series across opposite points of the secondary; and a fourth resistor and the other capacitor connected in series between the mid-point of the secondary and a point between the other inductor winding and the third resistor; a first circuit whose phase is to be shifted connected to the mid-point of the secondary and to a point between the second resistor and the one capacitor; a second circuit whose phase is to be shifted connected to the mid-point of the secondary and a point between the fourth resistor and the other capacitor; and means to variably energize the unidirectional winding with unidirectional current.

6. In a phase shift system, a circuit which may be diagrammatically represented as a rectangular bridge circuit and having resistors in two of its opposite arms and inductor windings in the other two arms; a three leg saturable core; the two inductor windings being on two of the legs, and a winding on the third leg arranged to be energized with variable unidirectional current; a transformer having a primary for energization from a source of alternating potential and a secondary; opposite spaced points of the secondary being connected to the bridge circuit at two of the diagonally opposite points thereof; a first circuit whose phase is to be shifted connected across a mid-point of the secondary and a third corner of the bridge circuit; and a second circuit whose phase is to be shifted connected across a mid-point of the secondary and the fourth corner of the bridge circuit.

7. In a phase shift system, a circuit which may be diagrammatically represented as a rectangular bridge circuit and having resistors in two of its opposite arms and inductor windings in the other two arms; a three leg saturable core; the two inductor windings being on two of the legs, and a winding on the third leg arranged to be energized with variable unidirectional current; a transformer having a primary for energization from a source of alternating potential and a secondary; opposite spaced points of the secondary being connected to the bridge circuit at two of the diagonally opposite points thereof; a resistor and a capacitor connected in series between each of the other diagonal points and a mid-point of the secondary; two circuits whose phases respectively are to be shifted, both connected to a mid-point of the secondary and respectively connected to points between the respective series connected resistor and capacitor.

WILLIAM FEW.

REFERENCES CITED

The following references are of record in the file of this patent:

UNITED STATES PATENTS

| Number | Name | Date |
|---|---|---|
| 1,851,692 | Zucker | Mar. 29, 1932 |
| 1,965,439 | Stoller | July 3, 1934 |
| 1,995,404 | Stoller | Mar. 26, 1935 |
| 2,032,176 | Kovalsky | Feb. 25, 1936 |
| 2,039,044 | Wolfert | Apr. 28, 1936 |
| 2,042,234 | Lyle | May 26, 1936 |
| 2,235,551 | Garman | Mar. 18, 1941 |
| 2,399,266 | Stiefel | Apr. 30, 1946 |
| 2,408,193 | Beste | Sept. 24, 1946 |